US010360723B2

(12) United States Patent
Mills et al.

(10) Patent No.: US 10,360,723 B2
(45) Date of Patent: Jul. 23, 2019

(54) METHOD AND APPARATUS FOR AUTOMATED PROJECTION MAPPING PREVISUALIZATION

(71) Applicant: CHRISTIE DIGITAL SYSTEMS USA, INC., Cypress, CA (US)

(72) Inventors: Shawn David Mills, Breslau (CA); Gerhard Dietrich Klassen, Waterloo (CA); Ian Chadwyck Faragher, Kitchener (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 12 days.

(21) Appl. No.: 15/671,280

(22) Filed: Aug. 8, 2017

(65) Prior Publication Data

US 2019/0051041 A1     Feb. 14, 2019

(51) Int. Cl.
| | |
|---|---|
| *E02F 5/14* | (2006.01) |
| *E02F 9/26* | (2006.01) |
| *H04N 9/31* | (2006.01) |
| *G01S 19/43* | (2010.01) |
| *G02B 27/01* | (2006.01) |
| *G06T 17/05* | (2011.01) |

(Continued)

(52) U.S. Cl.
CPC .............. *G06T 17/05* (2013.01); *E02F 5/145* (2013.01); *E02F 9/261* (2013.01); *G02B 27/01* (2013.01); *G06T 19/006* (2013.01); *H04N 9/3185* (2013.01); *G01S 19/43* (2013.01); *G02B 2027/014* (2013.01); *G09B 29/106* (2013.01)

(58) Field of Classification Search
None
See application file for complete search history.

(56) References Cited

U.S. PATENT DOCUMENTS

| | | | |
|---|---|---|---|
| 8,436,872 B2 | 5/2013 | Wright et al. | |
| 8,466,915 B1 * | 6/2013 | Frueh | G06T 17/05 |
| | | | 345/420 |
| 9,451,245 B1 | 9/2016 | Darling | |

(Continued)

OTHER PUBLICATIONS d3 Technologies, "Features—Projector Simulation", Mar. 30, 2015, Retrieved from the Internet on Jan. 20, 2017, URL: http://web.archive.org/web/20150330144818/http://d3technologies.com/features/projector_simulatio.

(Continued)

*Primary Examiner* — Jason A Pringle-Parker
(74) *Attorney, Agent, or Firm* — Perry + Currier, Inc.

(57) ABSTRACT

A method and apparatus for automated projection mapping previsualization is provided. A computer model of an object is received, at a controller of a device, from a publicly accessible remote mapping server, the computer model comprising a publicly available three-dimensional computer model, the computer model defining an object in geographic coordinates and elevation coordinates, the object located at given geographic coordinates. The controller generates a time dependent previsualization projection mapping model for the object using images to be projected onto the object, the computer model, and data for generating one or more of Sun behavior and the Moon behavior at the given geographic coordinates. The controller controls a display device to render a previsualization of the time dependent previsualization projection mapping model.

20 Claims, 13 Drawing Sheets

(51) Int. Cl.
*G06T 19/00* (2011.01)
*G09B 29/10* (2006.01)

(56) References Cited

U.S. PATENT DOCUMENTS

| | | | |
|---|---|---|---|
| 2008/0033641 A1* | 2/2008 | Medalia | G06F 3/04815 701/533 |
| 2009/0219199 A1 | 11/2009 | Borchert et al. | |
| 2017/0277389 A1* | 9/2017 | Matas Rodriguez | G06T 17/05 |
| 2018/0007341 A1* | 1/2018 | Okuley | G06K 9/00201 |
| 2018/0063494 A1* | 3/2018 | Tanabe | H04N 9/3147 |
| 2018/0095607 A1* | 4/2018 | Proctor | G09F 19/18 |

OTHER PUBLICATIONS d3 Technologies, "Features—Realtime 3d Simulation", Feb. 6, 2015, Retrieved from the Internet on Jan. 11, 2017, URL: http://web.archive.org/web/20150206003023/http://www.d3technologies.com:80/features/3d_simulation.

Dataton AB, "3D Creation", Sep. 22, 2015, vimeo, Retrieved from the Internet on Jan. 26, 2017, URL: https://vimeo.com/140065274.

Dataton AB, "Dataton showcases WATCHOUT 6 at InfoComm 15", Jun. 15, 2011, Retrived from the Internet on Jan. 20, 2017, URL: https://www.dataton.com/press/dataon-showcases-watchout-6-at-infocomm-15.

Dataton AB, "Dataton WATCHOUT 6 Overview", Jun. 4, 2015, vimeo, Retrieved from the Internet on Jan. 26, 2017, URL: https://vimeo.com/129773549.

Dataton AB, WATCHOUT v6.0 Manual, Jan. 1, 2015, Retrieved from the Internet on Jan. 23, 2017, URL: http://academy.dataton.com/wo6/WATCHOUT_6_manual.pdf.

EPO, Extended European Search Report, dated Jan. 31, 2019, re European Patent Application No. 18187346.4.

Jason, "Creating a Topography Mesh from Flat Contours in Sketchup Tutorials", Oct. 3, 2011, Sketchup Tutorials, Retrieved from the Internet on Jan. 15, 2019, URL: http://www.sketchuptutorials.net/2011/10/03/creating-a-topography-mesh-from-flat-contours-in-sketchup-t.

Reinke, T, "Pointools introduces Point Cloud plug-in for Google SketchUp", Nov. 30, 2010, Scanable, Retrieved from the Internet on Jan. 15, 2019, URL: http://scanable.com/point-cloud/pointools-introduces-point-cloud-plug-in-for-google-sketchup/.

Roskes, Bonnie, "SketchUp Shadow Studies—Danie Tal", Jun. 13, 2017, Retrieved from the Internet on Jan. 14, 2019, URL: https://danieltal.com/sketchup-shadow-studies/.

Suplugins, "Podium Browser Cloud Domes", Jun. 29, 2017, Retrieved from the Internet on Jan. 15, 2019, URL: https://web.archive.org/web/20170629042230/http://suplugins.com/podium/cloud-domes.php.

* cited by examiner

METHOD AND APPARATUS FOR AUTOMATED PROJECTION MAPPING PREVISUALIZATION

FIELD

The specification relates generally to projection mapping, and specifically to a method and apparatus for automated projection mapping previsualization.

BACKGROUND

In order to effectively projection map onto complex objects, such as buildings, generally a large amount of data of the complex object must be gathered prior to designing the images to be projection mapped onto the complex object. For example, for buildings, a high-resolution scanning service (such as a laser scanner, a camera-projector screen-learning system, a traditional/manual site survey) may be used to obtain a model of the building; alternatively, a blue-print of the building may be used to obtain a model of the building, and/or a computer-aided design (CAD) model from the original construction of the building may be used. All of these may be expensive and/or time consuming to either obtain, or even use in projection mapping planning and/or previsualization, as associated files can be massive, requiring large processing overhead. Furthermore, such models generally include only minimal geographic references, for example, a measured Global Positioning System (GPC) point, a "North" vector, etc. Hence, in obtaining the models, often a geographic site survey must be performed to further determine projector placement and/or projector pose, which may also be time consuming and expensive.

SUMMARY

Provided herein is a method and apparatus for automated projection mapping previsualization in which a computer model of an object, onto which projection mapping is to occur, is received from a publicly accessible remote mapping server, the computer model comprising a publicly available three-dimensional computer model, the computer model defining the object in geographic coordinates and elevation coordinates. Data for generating one or more of Sun behavior and Moon behavior at given geographic coordinates of the object is used, with the computer model, to generate a time dependent previsualization projection mapping model for the object. The time dependent previsualization projection mapping model is used, with images for projection, to render a previsualization of the time dependent previsualization projection mapping model at a display device. The time dependent previsualization projection mapping model may be used to determine projector placement and/or pose. The computer model of the object may further include a three-dimensional model of a geographic region adjacent the object which may also be used to determine projector placement and/or pose. Furthermore, a higher resolution model of the object may be obtained and aligned with the computer model; the higher resolution model of the object may be obtained at the geographic location of the object using, for example, a laser scanner and the like; the geographic data in the computer model may be used to enhance the second computer model. Furthermore, the second computer model, aligned with the computer model, and the time dependent previsualization projection mapping model, is used to generate rendered images for projection mapping by the projectors.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some implementations, the terms are understood to be "within 10%," in other implementations, "within 5%", in yet further implementations, "within 1%", and in yet further implementations "within 0.5%".

An aspect of the specification provides a device comprising: a communication interface, a controller, and a memory storing: images to be projected onto an object located at given geographic coordinates, and data for generating one or more of Sun behavior and Moon behavior at the given geographic coordinates; the controller configured to: receive, using the communication interface, a computer model of the object from a publicly accessible remote mapping server, the computer model comprising a publicly available three-dimensional computer model, the computer model defining the object in geographic coordinates and elevation coordinates; generate a time dependent previsualization projection mapping model for the object using the images, the computer model and the data for generating one or more of the Sun behavior and the Moon behavior at the given geographic coordinates; and, control a display device to render a previsualization of the time dependent previsualization projection mapping model.

Another aspect of the specification provides a method comprising: receiving, at a controller, using a communication interface, a computer model of an object from a publicly accessible remote mapping server, the computer model comprising a publicly available three-dimensional computer model, the computer model defining the object in geographic coordinates and elevation coordinates, the object located at given geographic coordinates; generating, using the controller, a time dependent previsualization projection mapping model for the object using images to be projected onto the object, the computer model, and data for generating one or more of Sun behavior and the Moon behavior at the given geographic coordinates; and, controlling, using the controller, a display device to render a previsualization of the time dependent previsualization projection mapping model.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
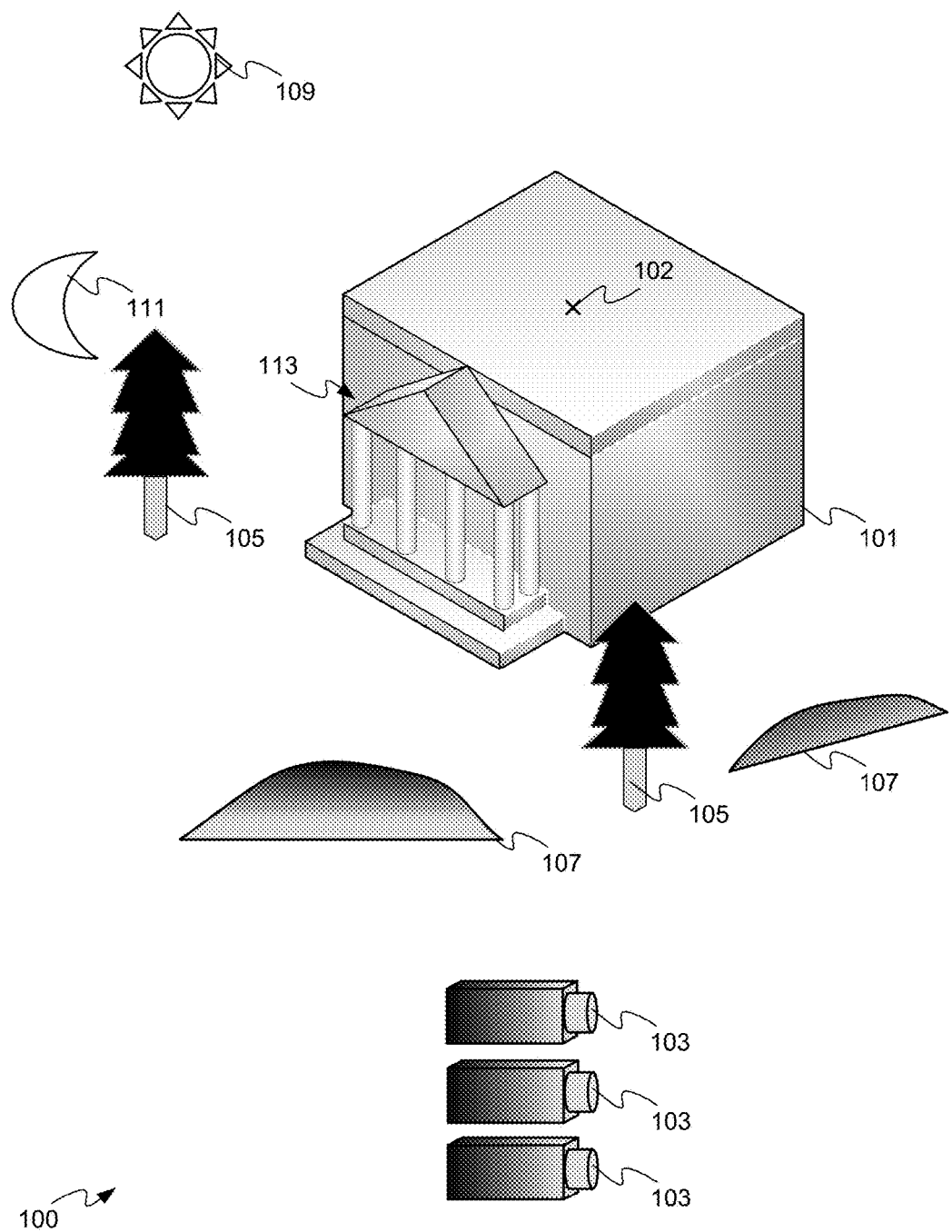
FIG. 1 depicts a location that includes a building onto which projection mapping is to occur using one or more projectors, according to non-limiting implementations.

Attention is directed to FIG. 1 which depicts a location 100 that includes a building 101 (located at given geographic coordinates 102) which may be evaluated for projection mapping using, for example, one or more projectors 103. While represented in FIG. 1 as an "X", the given geographic coordinates 102 may be defined as, for example, one or of GPS (Global Positioning System) coordinates, GLONASS (Globalnaya Navigazionnaya Sputnikovaya Sistema) coordinates, latitude/longitude pairs, and the like. While not depicted, it is further assumed that a position of the building 101 at the coordinates 102 may be further defined with respect to a heading (e.g. a direction of a facade of the building 101). Determining where to position the projectors 103 relative to the building 101 for projection mapping planning can be a complex problem, which is further complicated by landscape and/or geographic features in the area of the building, such as trees 105, hillocks 107, and the like. For example, the position of the trees 105, and the like, generally restrict where the projectors 103 may be positioned as the trees 105 restrict lines of site. Similarly, the hillocks 107, and/or other changes in elevation relative to the building 101, may affect the images projected by the projectors 103 during projection mapping, as when a projector 103 is located on a hillock 107, the angle and/or pose of any projectors 103 on a hillock 107 may have a different elevation from other projectors 103.

Other environmental factors may further affect the projection mapping. For example, the Sun 109 has a path through the sky, relative to the building 101 (e.g. according to the coordinates 102 and/or a heading) that will cause the building 101 to be illuminated at different angles and different brightness levels. Indeed, in many prior art projection mapping scenarios, projection occurs only after sunset. Similarly, the Moon 111 also has a path through the sky, relative to the building 101 that will cause the building 101 to be illuminated at different angles and different brightness levels, after sunset, which is further dependent on the phases of the Moon 111.

Furthermore, as depicted, the building 101 has a complex facade 113 with a portico that includes multiple steps, a gable, columns, etc. Hence, in projection mapping, images projected onto the facade 113 by the projectors 103 are to be adapted for projection onto these architectural features.

Indeed, in previsualization projection mapping planning, computer models of objects, such as the building 101, are used to determine respective locations and/or a number of the projectors 103, estimates of how to render images to be projected, including adjusting the images for environmental light factors, and event planning (e.g. when to start the projection mapping at an event). For example, objects such as the building 101 may be rendered at a display device using a computer model, and numbers and/or locations of the projectors 103 are selected based on the computer model.

However, to accurately render such images for in-situ projection mapping, a high-resolution model of the building 101 is obtained using laser-scanning techniques, and/or a computer aided drawing (CAD) model of the building 101 may be available, for example from the original construction of the building 101. Either way, such models are generally both large and require a large processing resource overhead; further, obtaining such models acts as a general impedance to planning projection mapping sites, such as determining where to place the projectors 103.

Hence, ideally, the previsualization phase of the projection mapping planning would occur independent of obtaining such high-resolution models, at least initially.

Complicating the problem, the coordinates 102 and/or the heading of the building 101 may not initially be known, however an address of the building 101 may be known.

Figure 2:
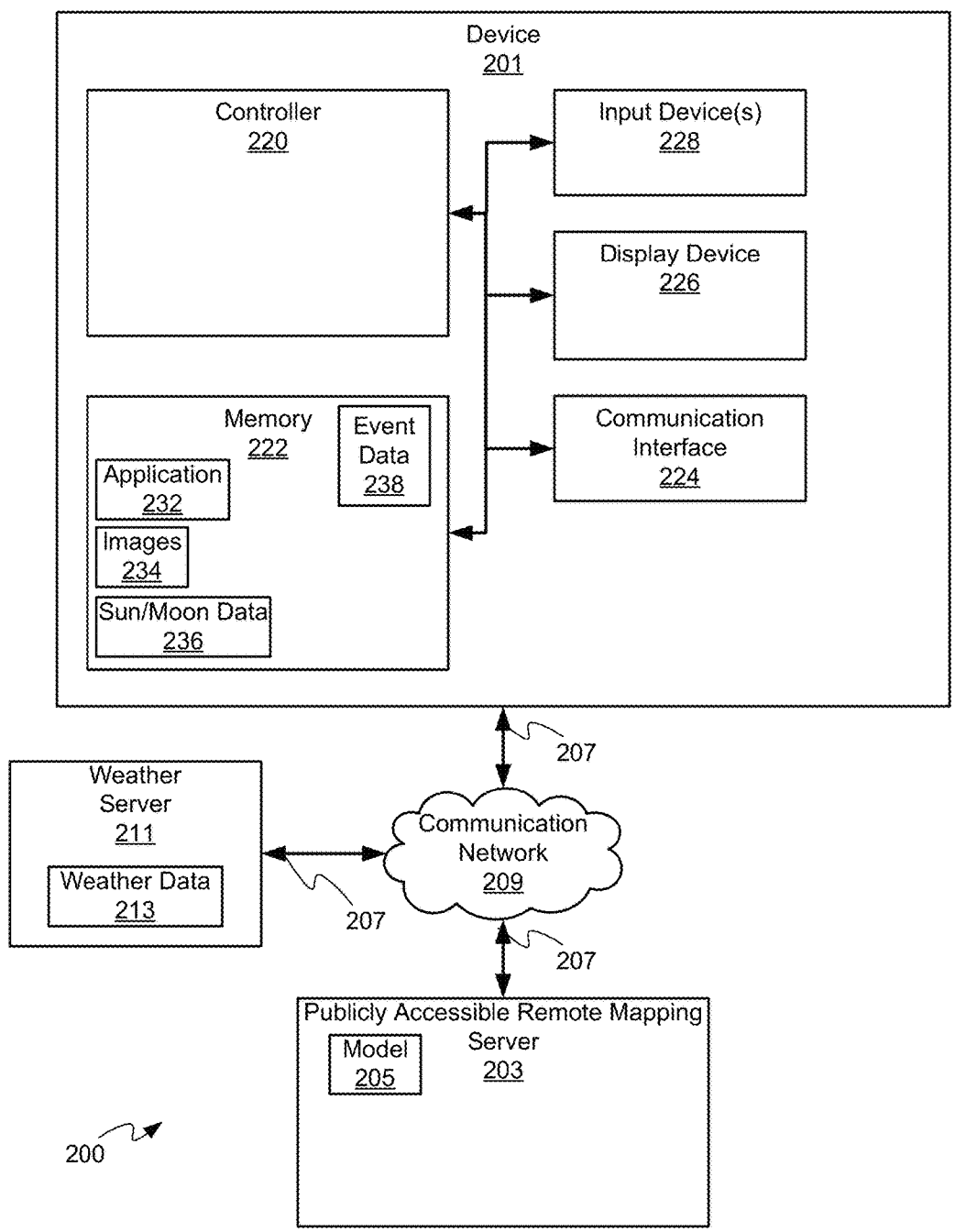
FIG. 2 depicts a system for automated projection mapping previsualization, according to non-limiting implementations.

Hence, attention is next directed to FIG. 2 which depicts a system 200 that includes a device 201 configured for automated projection mapping previsualization. As depicted, the system 200 includes a publicly accessible remote mapping server 203 storing a computer model 205 of an object onto which projection mapping is to occur (and/or is to be evaluated for projection mapping), for example the building 101. The publicly accessible remote mapping server 203 is interchangeably referred to hereafter as the server 203. Furthermore, while present implementations will be described with respect to the building 101, present implementations may be applied to any object and/or structure onto which projection mapping is to occur and/or which is to be evaluated for projection mapping. The device 201 and the server 203 are in communication using respective communication links 207 with a communication network 209.

As depicted, the system 200 further includes an optional weather server 211 configured to provide weather data 213 to the device 201. For example, the device 201 may request the weather data 213 for a given location (e.g. at the building 101) and/or a given time period (for example, a projection mapping event that is to occur at the building 101). The weather server 211 may comprise a publicly accessible remote weather server in communication the device 201 using respective communication links 207 with the communication network 209.

The device 201 comprises a controller 220, a memory 222, a communication interface 224 (interchangeably referred to hereafter as the interface 224), a display device 226 and one or more input devices 228. The memory 222 stores: an application 232; images 234 to be rendered for projection onto an object (e.g. the building 101) located at the given geographic coordinates 102, and data 236 for generating one or more of Sun behavior and Moon behavior at the given geographic coordinates 102. However, in other implementations, the images 234 and/or the data 236 are not stored at the memory 222, are accessible to the controller 220 via, for example, the interface 224 (e.g. downloadable from another device and/or memory). In yet further implementations, the images 234 can be generated upon demand, for example using an image generator (e.g. at the device 201 and/or another device).

The images 234 generally comprise images that may be rendered for projection onto an object such as the building 101; for example, for projection mapping, the images 234 may be divided into portions for projection onto various surfaces of the building 101. However, when the previsualization techniques, as described below, are to be used to evaluate the location 100 for suitability for projection mapping, the images 234 may comprise blank and/or white and/or default images (e.g. images without content specifically designed for projection mapping onto the building 101 and/or an object).

As depicted, the memory 222 further stores optional event data 238 defining an event that may occur proximal an object (e.g. the building 101); the event data 238 may include, but is not limited to, times of an event that may occur proximal the building 101 (and the like), an address of the event, estimation of crowd sizes during the times of the event, and the like. In some implementations, the event data 238 defines an event during which projection mapping onto the building 101 may occur. In yet further implementations, the event data 238 may be used to determine illumination (e.g. luminance) and/or perceived illumination (e.g. brightness) of the building 101 by people at the event, for example based on estimated times and sizes of crowds at the event, and estimates of light produced by such crowds (e.g. due to glare from cell phones, and the like). The event data 238 may be received from another external device and/or server, and/or provisioned at the memory 222 by an administrator of the device 201; alternatively, the event data 238 may be stored at another device and is accessible to the controller 220 via the interface 224.

The controller 220 is generally configured to: receive, using the communication interface 224, the computer model 205 of the object (e.g. the building 101) from the publicly accessible remote mapping server 203, the computer model 205 comprising a publicly available three-dimensional computer model, the computer model 205 defining the object (e.g. the building 101) in geographic coordinates and elevation coordinates; generate a time dependent previsualization projection mapping model for the object (e.g. the building 101) using the images 234, the computer model 205 and the data 236 for generating one or more of the Sun behavior and the Moon behavior at the given geographic coordinates 102; and, control the display device 226 to render a previsualization of the time dependent previsualization projection mapping model. The controller 220 may be further configured to determine a heading of the object (e.g. the building 101) using the computer model 205 in order to determine a position of the Sun 109 and/or the Moon 111 with respect to the facade 113 of the building 101 at a given time.

The server 203 generally comprises any publicly accessible remote mapping server, accessible, for example, via the Internet and including, but not limited to, a Google™ mapping server, a government mapping server (e.g. as maintained by a municipality, a region a government) and the like. Indeed, the computer model 205 comprises a model of the building 101 in any suitable format including, but not limited to, DXF (Drawing Exchange Format) file, a GIS (geographic information system) file, a PCD (Point Cloud Data) file, an OBJ file, a color coordinate file defining color of the building 101), and the like.

Indeed, such computer models are generally publicly available via mapping servers and generally comprise relatively low fidelity geometric models of structures, buildings, and the like, as well as their absolute respective positions relative to the Earth. Such computer models are often generated by users and uploaded to such mapping servers; and/or such computer models may be generated using surveys of a region (e.g. as performed using sonar and/or stereo photography, and the like, from an airplane, a helicopter, a drone, and the like). Such computer models generally include data which define a geographic location and elevation of points in space that in turn define a structure and/or a building.

Furthermore, such computer models of objects, and the like, are generally stored in association with other computer models of adjacent objects and/or buildings and/or structures. Indeed, such computer models may further be stored with data indicative of "busy" times at various locations, such as buildings, which may further be used to estimate light emitted by buildings at given times. Indeed, in some implementations, such other computer models may also include locations of streetlamps, and the like, as well as data indicative of times those streetlamps are operational and/or brightness of light emitted by the streetlamps, and the like. Alternatively, the device 201 may be configured to estimate brightness and/or direction of light emitted by the streetlamps given locations of the streetlamps.

Furthermore, such computer models are generally stored in association with three-dimensional models of a geographic region adjacent the objects such as position estimates of the trees 105 and/or topographical data, for example elevations of the region around the building 101, such as elevations of the hillocks 107.

Hence, when the device 201 requests the computer model 205 the server 203, the device 201 can request that the computer model 205 include not only a model of the building 101, but a geographic region adjacent the building 101, which may include environmental information (e.g. positions of trees, adjacent buildings, streetlamps etc., and/or times of operation and/or "busy" periods), topographic information and the like.

However, a limitation of such computer models is that their resolution is generally too low (e.g. on the order of 1 point per meter) to perform accurate and/or precise projection mapping; however, as described herein, such computer models may be used for automated projection mapping previsualization.

Figure 3:
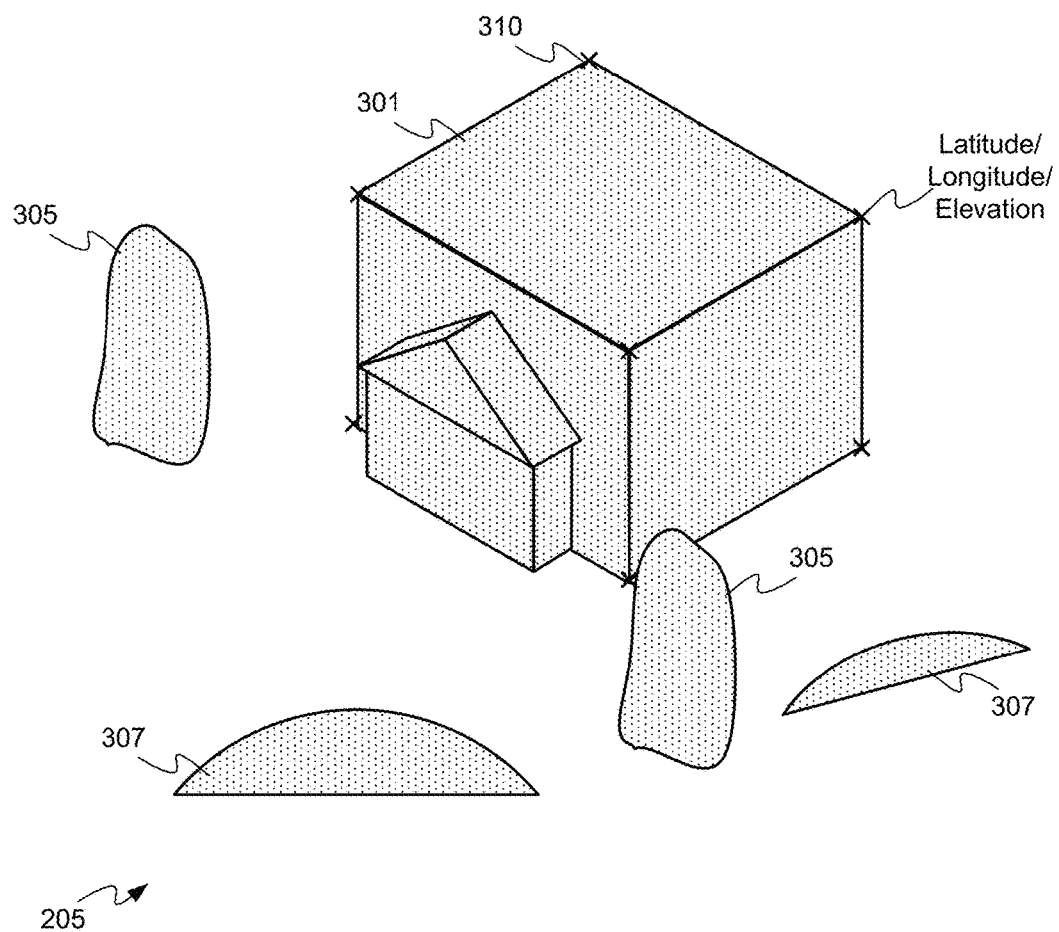
FIG. 3 depicts a visual representation of a publicly available three-dimensional computer model, according to non-limiting implementations.

For example, attention is directed to FIG. 3 which depicts a visual representation of the computer model 205 (interchangeably referred to hereafter as the model 205), which defines a model 301 of the building 101, models 305 of the trees 105 (e.g. environmental data), and models 307 of the hillocks 107 (e.g. topographical data). Furthermore, features in the model 205 are defined by a plurality of points 310; while only seven such points 310 are shown in FIG. 3, each represented by a respective "X", the model 307 comprises a plurality of such points 310, each comprising respective geographic coordinates (e.g. as depicted latitude and longitude), and elevation, e.g. relative to the Earth. Hence, each of the models 301, 305, 307 represent the building 101, the trees 105 and the hillocks 107 relative to each other and relative to the Earth. While not depicted, the model 205 may include positions of streetlamps, buildings and the like adjacent the building 101, and may further include times of operation of the streetlamps, the buildings and the like, and/or busy periods and/or schedules of the streetlamps, buildings and the like, etc.

However, as the model 205 (e.g. the models 301, 305, 307) is of relatively low fidelity (e.g. compared to a model of the building 101 obtained using an in-situ laser scan of the building 101), the points 310 may not be sufficient to define fine details of the building 101, the trees 105, and the hillocks 107. For example, as depicted, the columns and steps of the building 101 are not defined by the model 301; rather, the model 301 defines the general three-dimensional shape and outline of the building 101, relative to the Earth. Similarly, the branches and trunks of the trees 105 are not defined by the model 305; rather the model 305 defines the general three-dimensional volume of the trees 105, as well as their position relative to the Earth and to the building 101. Similarly, topographical detail (e.g. local depressions and/or bumps) of the hillocks 107 are not defined by the model 307; rather the model 307 defines the general three-dimensional volume of the hillocks 107, as well as their position relative to the Earth and to the building 101.

Furthermore, the given geographic coordinates 102 of the building 101 may be determined from the model 205. For example, when requesting the model 205 from the server 203, the device 201 may specify a street address, and the like, of the building 101 in a request for the model 205, and the server 203 may return the model 205 as corresponding to the specified street address, the model 205 including the geographic coordinates 102 of the building 101.

Furthermore, a heading of the building 101 may be determined from the model 205, for example a geographical direction in which the facade 113 of the building 101 is facing.

Returning to FIG. 2, the data 236 comprises data for generating one or more of Sun behavior and Moon behavior at given geographic coordinates. For example, the data 236 may comprise formulae, a table, a lookup table, and the like, for positions of the Sun 109 and/or the Moon 111 relative to the Earth, as a function of geographic location, time of day and date. Using the data 236, a time dependent model of the behavior of the Sun 109 and/or the Moon 111 at a given geographic location may be determined which, when combined with the model 205, further yields a time dependent model of the position of light from the Sun 109 and/or the Moon 111 on the building 101 and/or the facade 113, including, but not limited to, shadows from the trees 105, and the like.

Such a time dependent model may further be combined with the weather data 213 received from the weather server 211 and/or the event data 238 to further determine a time dependent model of other ambient light on the building 101, for example based on cloud cover that may obscure the Sun 109 and/or the Moon 111, and/or based on light from crowds at an event adjacent the building 101.

Similarly, any data in the model 205, indicative of ambient light emitted by adjacent buildings and/or streetlamps at given times, may be used to further supplement a time dependent model of light on the building 101.

Indeed, independent of (and/or supplemented by) the weather data 213, the event data 238, and the like, a time dependent model time dependent model of the position of light from the Sun 109 and/or the Moon 111 on the building 101 is combined with the images 234 to generate a time dependent previsualization projection mapping model, which may be used to determine one or more of: respective positions and/or respective poses of the projectors 103, render the images 234 for previsualization of projection mapping by the projectors 103 onto the building 101, adjust the previsualization of the images 234 for a position of light and/or shadow on the building 101 and the like.

For example, in a previsualization using the model 205, respective models of the projectors 103 may be positioned relative to the model 301 of the building 101, the model 305 of the trees 105 and/or the model 307 of the hillocks 10. Furthermore, portions of the images 234 may be extracted and assigned to each of the projectors 103 for projection within the previsualization. The portions of the images 234 may further be warped for viewing from a particular geographic viewing location. The positions of the projectors 103 may be adjusted within the previsualization to determine estimates of the positions of the projectors 103 for in-situ deployment adjacent the building 101. Furthermore, the time dependent model may be used to determine how to adjust the projected images to compensate for ambient light.

The device 201 can comprise any suitable computing device that may be used for projection mapping previsualization, including but not limited to a graphics processing unit (GPU), a graphics processing device, a graphics processing engine, a video processing device, a personal computer (PC), a laptop, a server, and the like.

The controller 220 can comprise a processor and/or a plurality of processors, including but not limited to one or more central processors (CPUs) and/or one or more processing units; either way, the controller 220 comprises a hardware element and/or a hardware processor. Indeed, in some implementations, the controller 220 can comprise an ASIC (application-specific integrated circuit) and/or an FPGA (field-programmable gate array) specifically configured to implement specific projection mapping previsualization functionality. Hence, the device 201 is preferably not a generic computing device, but a device specifically configured to implement specific projection mapping previsualization functionality. For example, the device 201 and/or the controller 220 can comprise a computer executable engine configured to implement specific projection mapping previsualization functionality.

The memory 222 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of the device 201 as described herein are typically maintained, persistently, in the memory 222 and used by the controller 220 which makes appropriate utilization of volatile storage during the execution of such programming instructions. Those skilled in the art recognize that the memory 222 is an example of computer readable media that can store programming instructions executable on the controller 220. Furthermore, the memory 222 is also an example of a memory unit and/or memory module and/or a non-volatile memory.

In particular, the memory 222 stores an application 232 that, when processed by the controller 220, enables the controller 220 and/or the device 201 to: receive, using the communication interface 224, the computer model 205 of the object (e.g. the building 101) from the publicly accessible remote mapping server 203, the computer model 205 comprising a publicly available three-dimensional computer model, the computer model 205 defining the object (e.g. the building 101) in geographic coordinates and elevation coordinates; generate a time dependent previsualization projection mapping model for the object (e.g. the building 101) using the images 234, the computer model 205 and the data 236 for generating one or more of the Sun behavior and the Moon behavior at the given geographic coordinates 102; and, control the display device 226 to render a previsualization of the time dependent previsualization projection mapping model. The controller 220 may be further configured to determine a heading of the object (e.g. the building 101) using the computer model 205.

Interface 224 comprises any suitable wired or wireless communication interface configured to communicate with the communication network 209 in a wired and/or wireless manner as desired. Interface 224 can hence include one or more wired and/or wireless network interface cards and/or radios and the like. For example, the communication network 209 may include one or more of the Internet, a WLAN (wireless local area network), a WiFi network, a cellphone network, and the like, and the interface 224 comprises any suitable interface for implementing a link 207 thereto.

The display device 226 comprises any suitable one of, or combination of, flat panel displays (e.g. LCD (liquid crystal display), plasma displays, OLED (organic light emitting diode) displays) and the like, as well as one or more touch screens (including capacitive touchscreens and/or resistive touchscreens). In some implementations, the display device 226 may include a virtual reality (VR) device.

The input device 228 comprises any suitable one of, or combination of keyboards, pointing devices, touchpads, touchscreens, buttons, and the like. Furthermore, one or more of the display device 226 and the input device 228 may be external to the device 201 and accessible to the device 201 via the interface 224, and the like.

In any event, it should be understood that a wide variety of configurations for the device 201 are within the scope of present implementations.

Figure 4:
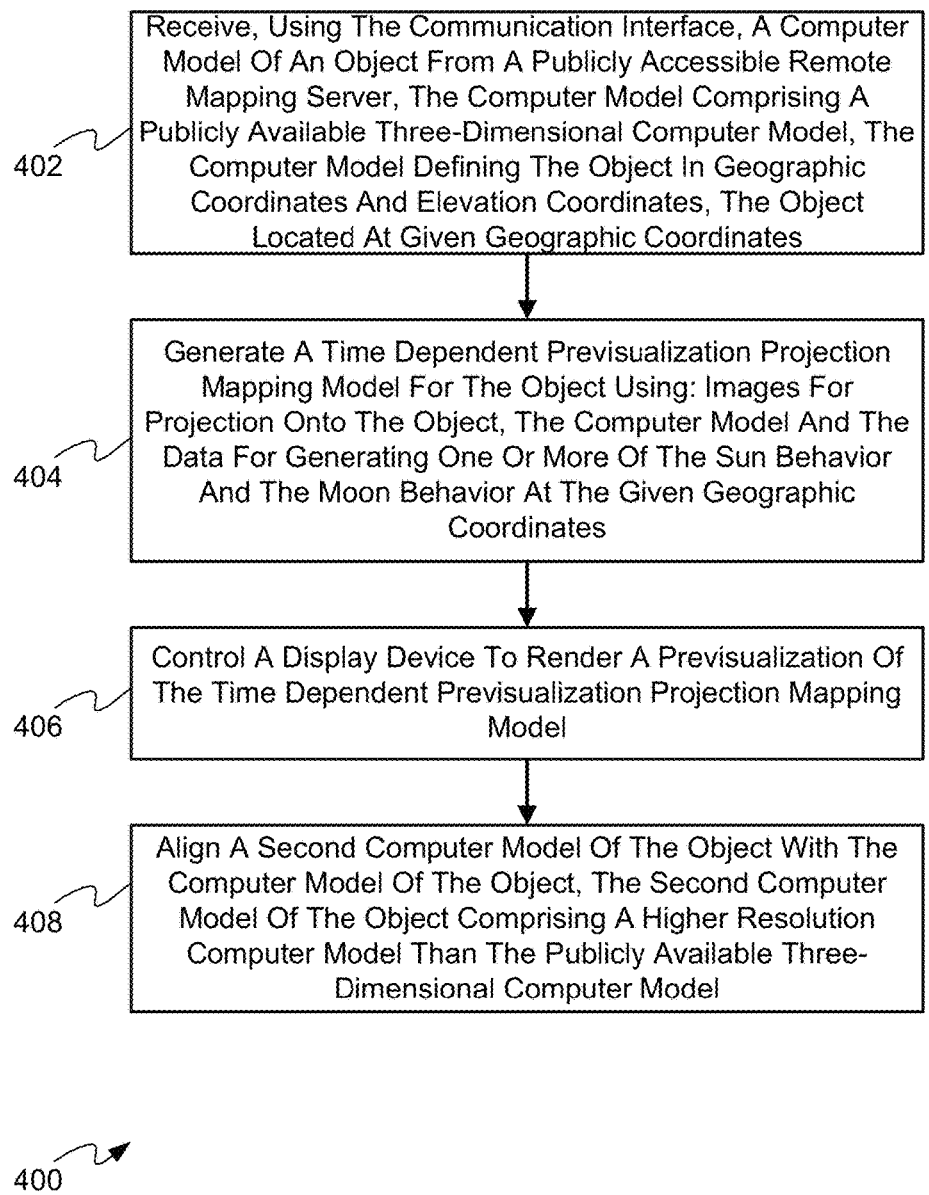
FIG. 4 depicts a flowchart of a method for automated projection mapping previsualization, according to non-limiting implementations.

Attention is now directed to FIG. 4, which depicts a flowchart of a method 400 for projection mapping previsualization, according to non-limiting implementations. In order to assist in the explanation of method 400, it will be assumed that method 400 is performed using the controller 220 of the device 201, for example when the controller 220 processes the application 232. Indeed, method 400 is one way in which the device 201 and/or the controller 220 can be configured. Furthermore, the following discussion of method 400 will lead to a further understanding of the device 201, and the system 20, and their various components. However, it is to be understood that the system 200 and/or the device 201 and/or the controller 220 and/or the method 400 can be varied, and need not work exactly as discussed herein in conjunction with each other, and that such variations are within the scope of present implementations.

Regardless, it is to be emphasized, that the method 400 need not be performed in the exact sequence as shown, unless otherwise indicated; and likewise, various blocks may be performed in parallel rather than in sequence; hence the elements of the method 400 are referred to herein as "blocks" rather than "steps". It is also to be understood, however, that the method 400 can be implemented on variations of the device 201 as well.

At a block 402, the controller 220 receives, using the communication interface 224, a computer model 205 of an object (e.g. the building 101) from a publicly accessible remote mapping server 203, the computer model 205 comprising a publicly available three-dimensional computer model, the computer model 205 defining the object (e.g. the building 101) in geographic coordinates and elevation coordinates.

At a block 404, the controller 220 generates a time dependent previsualization projection mapping model for the object (e.g. the building 101) using the images 234, the computer model 205 and the data 236 for generating one or more of the Sun behavior and the Moon behavior at the given geographic coordinates 102. When the images 234 and/or the data 236 are not stored in the memory 222, the block 204 can include, but is not limited to, one or more of retrieving the images 234 and/or the data from another device, and generating the images 234.

At a block 406, the controller 220 controls the display device 226 to render a previsualization of the time dependent previsualization projection mapping model.

At a block 408, the controller 220 aligns a second computer model of the object with the computer model 205 of the object, the second computer model of the object comprising a higher resolution computer model than the publicly available three-dimensional computer model. The second computer model may then be augmented using the computer model 205 and/or time dependent previsualization projection mapping model and used to render the images 234 for projection mapping by the projectors 103 onto the building 101.

The method 400 will now be described with reference to FIG. 5 to FIG. 12.

Figure 5:
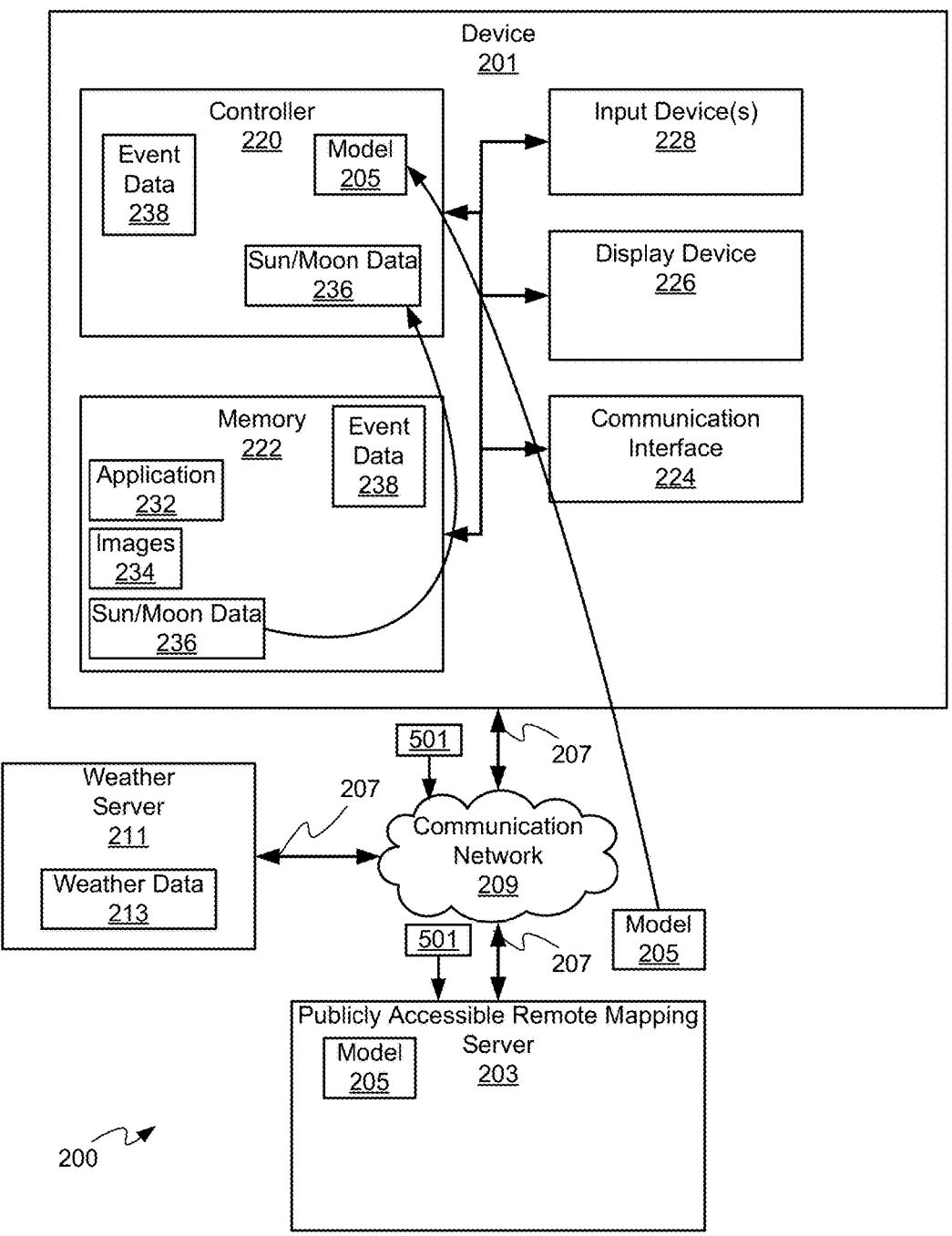
FIG. 5 depicts the device of FIG. 2 receiving a publicly available three-dimensional computer model of a building from a publicly accessible remote mapping server, according to non-limiting implementations.

Attention is next directed to FIG. 5 which is substantially similar to FIG. 2 with like elements having like numbers. In particular, FIG. 5 depicts an example implementation of the block 402 of the method 400. The controller 220 receives the computer model 205 by transmitting a request 501 for the computer model 205 to the server 203 via the interface 224, and the links 207 between the device 201, the server 203 and the network 209. For example, the application 232 may include a network address of the server 203, and the controller 220 may transmit the request 501 to the server 203 based on the network address.

Hence, the request 501 may be transmitted when the controller 220 is implementing the application 223 as part of a previsualization projection mapping process. The request 501 may include an address of the building 101 and/or geographic coordinates 102 of the building, and/or a set of geographic coordinates that define a region surrounding the building 101 (e.g. including the building 101). In some implementations, the address of the building 101, and the like, may be determined from the event data 238; hence, in FIG. 5, the controller 220 is depicted as having optionally retrieved the event data 238 from the memory 222.

In addition, the device 201 may be configured to interact with an API (application program interface) of the server 203, and the request 501 may hence be configured for receipt by the API of the server 203.

The server 203, in response to receiving the request 501, transmits the model 205 to the device 201, where the model 205 is received by the controller 220 (e.g. at the block 402 of the method 400). However, any other process for receiving the model 205 at the controller 220 is within the scope of the present specification.

In yet further implementations, the model 205 may be received via a browser application at the device 201 and the model 205 may be retrieved by browsing the server 203 and/or map data at the server 203 to select a region that corresponds to the model 205. In some of these implementations, the data 236 may also be received via a browser application.

FIG. 5 further depicts the controller 220 retrieving the data 236 from the memory 222.

Figure 6:
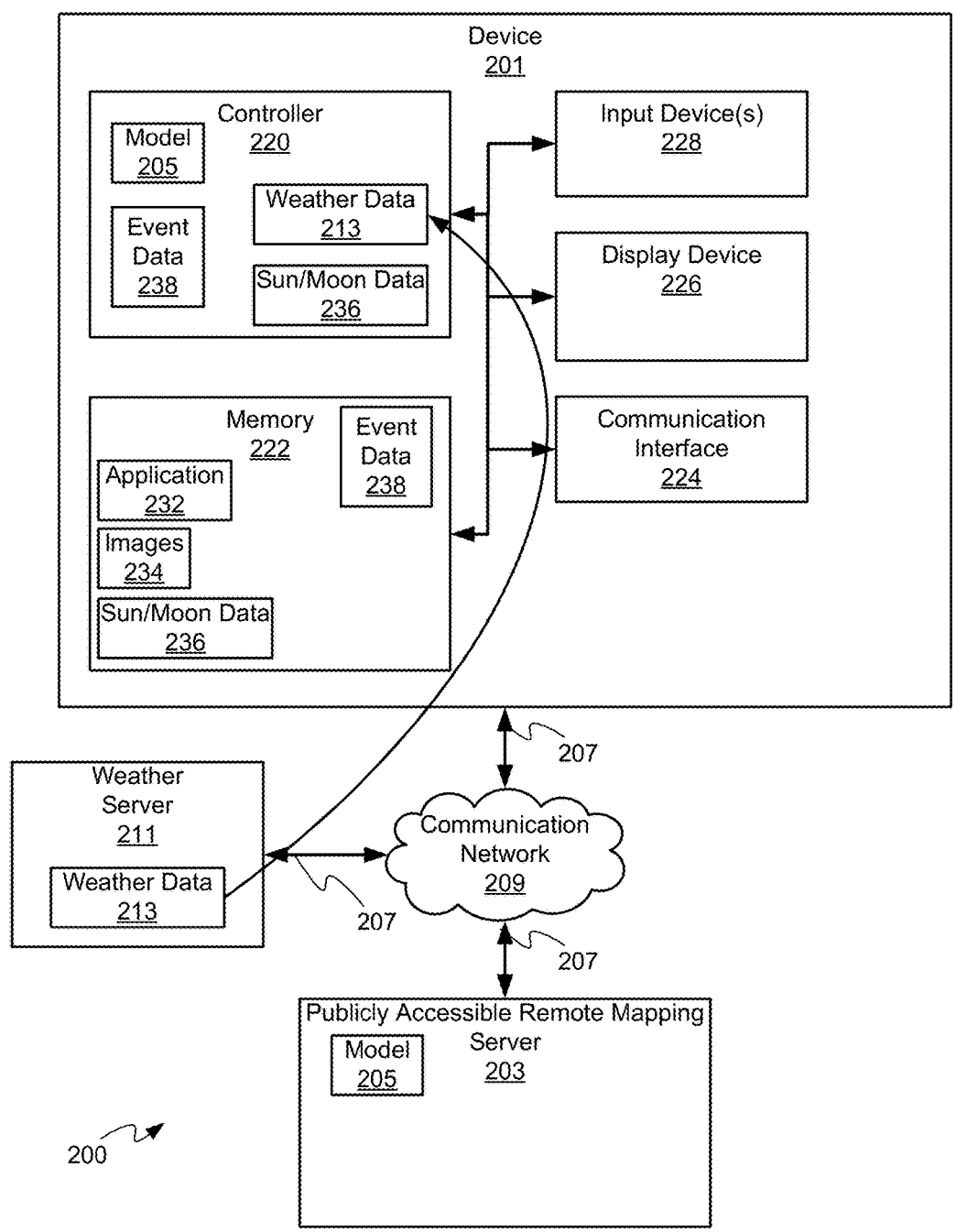
FIG. 6 depicts the device of FIG. 2 receiving a weather data from a weather server, according to non-limiting implementations.

Attention is next directed to FIG. 6, which is substantially similar to FIG. 5 with like elements having like numbers. FIG. 6 further depicts the controller 220 receiving the weather data 213 from the weather server 211. The weather data 213 may be requested by the controller 220, for example based on dates and/or a location in the event data 238 and/or based on the geographic coordinates 102 and/or based on geographic locations in the model 205.

Figure 7:
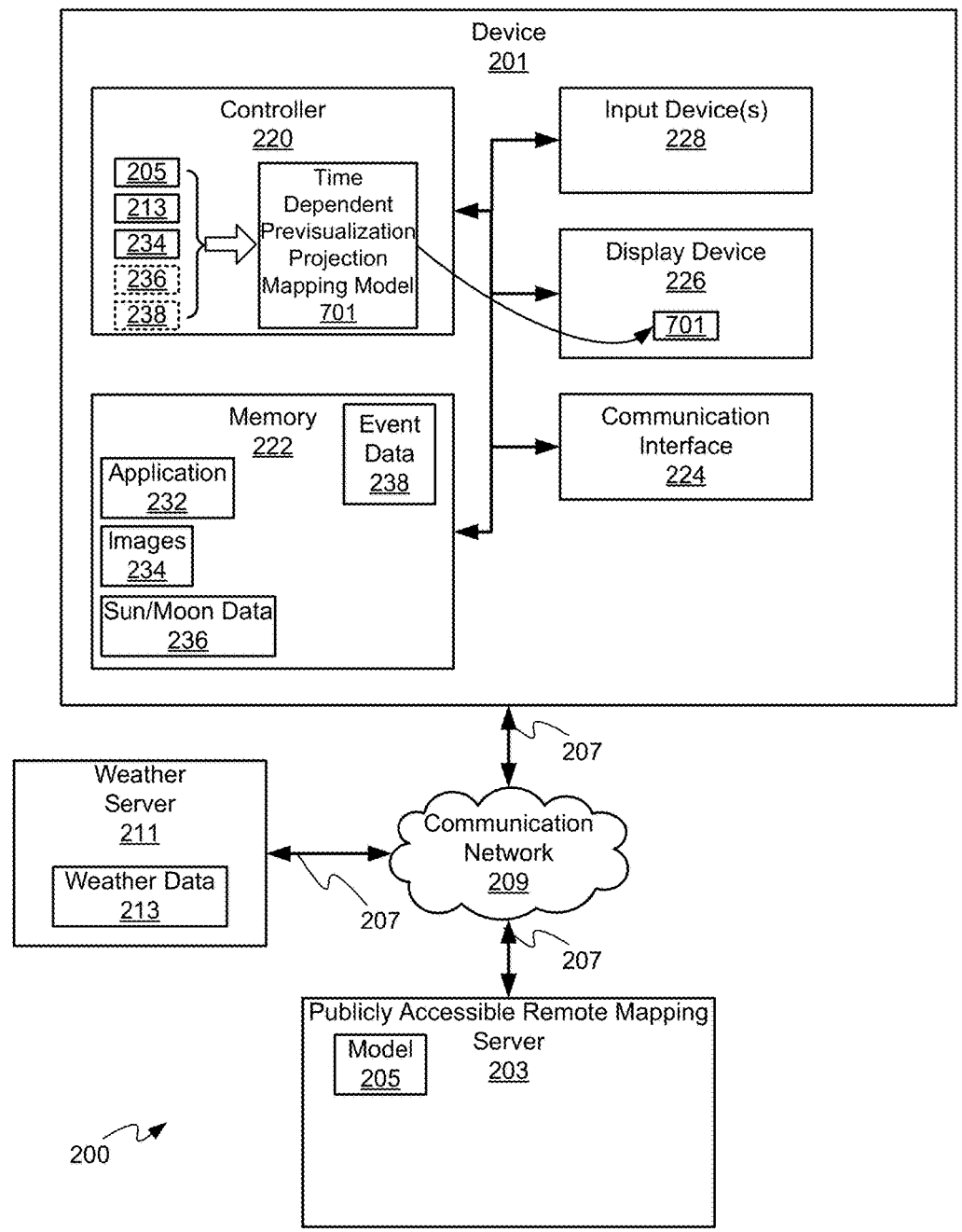
FIG. 7 depicts the device of FIG. 2 generating a time dependent previsualization projection mapping model, according to non-limiting implementations.

Attention is next directed to FIG. 7 which is substantially similar to FIG. 6 with like elements having like numbers. In particular, FIG. 7 depicts an example implementation of the blocks 404, 406 of the method 400. In particular, in FIG. 7, the controller 220 generates (e.g. at the block 404 of the method 400) a time dependent previsualization projection mapping model 701 for the object using the images 234 (e.g. as retrieved from the memory 222), the computer model 205 and the data 236 for generating one or more of the Sun behavior and the Moon behavior at the given geographic coordinates. As depicted, the controller 220 optionally generates the time dependent previsualization projection mapping model 701 further using the weather data 213 and the event data 238.

As also depicted in FIG. 7, the controller 220 further controls (e.g. at the block 406 of the method 400) the display device 226 to render a previsualization of the time dependent previsualization projection mapping model 701. In some implementations, the previsualization of the time dependent previsualization projection mapping model 701 is rendered in a browsing application at the device 201.

Figure 8:
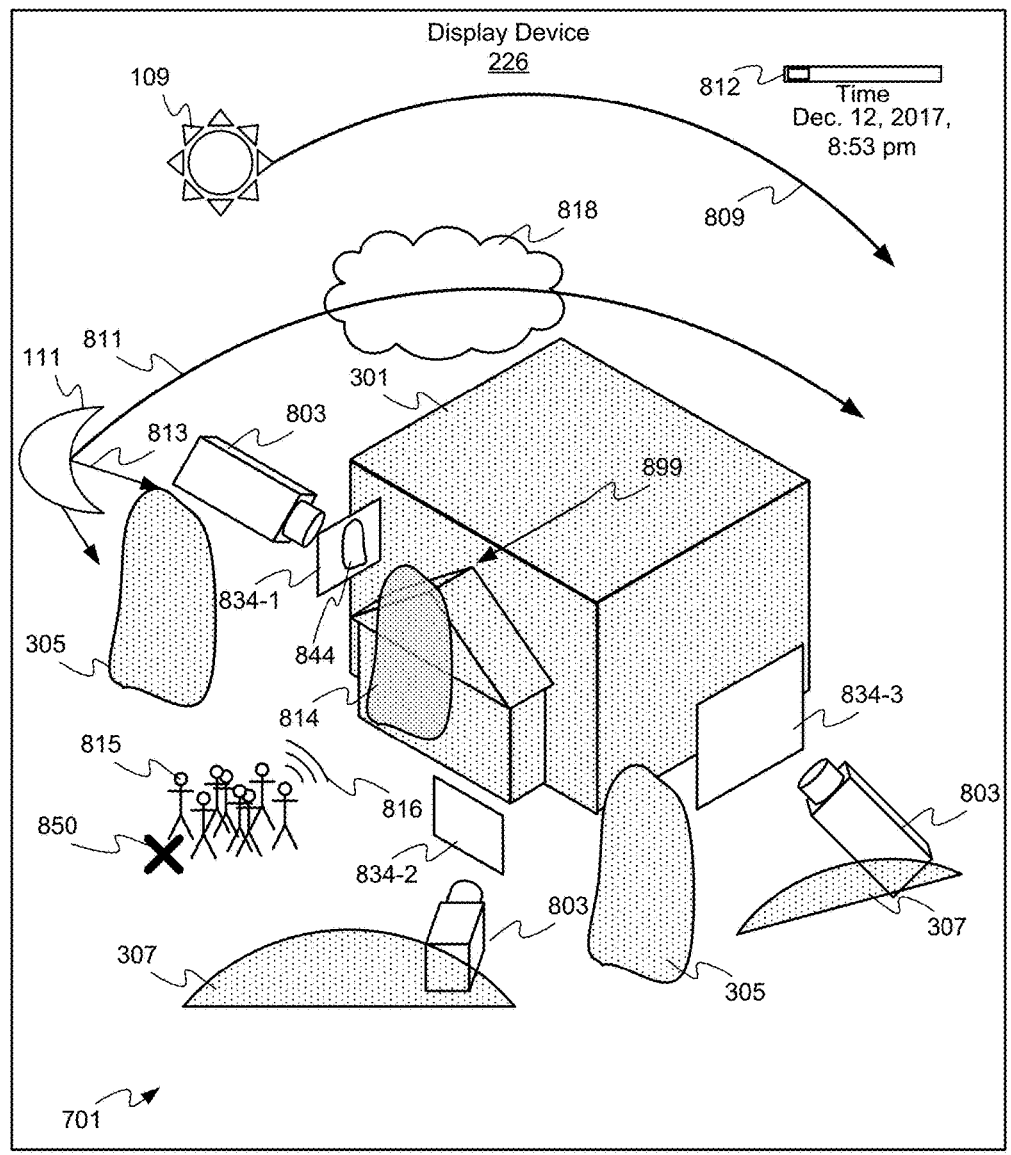
FIG. 8 depicts a visual representation of a time dependent previsualization projection mapping model, according to non-limiting implementations.

Attention is next directed to FIG. 8 which depicts an example visual representation of the previsualization of the time dependent previsualization projection mapping model 701 as rendered at the display device 226. While the rendering of previsualization of the time dependent previsualization projection mapping model 701 is depicted from a particular perspective, in some implementations, the previsualization of the time dependent previsualization projection mapping model 701 may be rendered from different angles and/or in a virtual reality display device.

In FIG. 8, the models 301, 305, 307 are rendered at the display device 226 using the model 205, as well as example locations of the projectors 103, as indicated using models 803 of the projectors 103.

The locations of the models 803 of the projectors 103 may be set manually and/or automatically. For example, assuming that a given portion of the images 234 are to be projection mapped onto the facade 113 of the building 101 and/or given surfaces of the building 101, the controller 220 may automatically determine estimates of the positions of the projectors 103 relative to the models 301, 305, 307 that will provide such projection mapping.

Hence, in some implementations, the time dependent previsualization projection mapping model 701 includes an indication of where to geographically locate one or more projectors 103, relative to an object (e.g. the building 101), the one or more projectors 103 for projecting the images 234 (and/or portions thereof) onto the object.

Indeed, the models 803 of the projectors 103 may generally include both intrinsic and extrinsic parameters of the projectors 103 including, but not limited to, positions within the time dependent previsualization projection mapping model 701 (e.g. relative to the model 301 of the building 101), angles of the projectors 103 within the time dependent previsualization projection mapping model 701 (e.g. relative to the model 301 of the building 101), including, but not limited to pose data, lens characteristics and the like. The position and/or pose of the models 803 of the projectors 103 is determined from the estimates of the positions of the projectors 103 relative to the models 301, 305, 307 that will provide such projection mapping, and the intrinsic properties of the models 803 (e.g. lens characteristics and the like) are determined, for example, from factory data, and the like, for the projectors 103 (e.g. data which provides specifications for the projectors 103).

Furthermore, the models 803 of the projectors 103 are further located such that the trees 105 and/or the hillocks 107, and the like (e.g. as represented by the models 305, 307) do not interfere with and/or block their projection and/or their placement. For example, a model 803 of a projector 103 is not located behind a model 305 (e.g. relative to the model 301), nor at a position of a model 305. Indeed, each model 803 may further include physical dimensions of a respective projector 103, and the models 803 are further positioned within the time dependent previsualization projection mapping model 701 at locations that would be achievable at the actual location 100 including, but not limited to, on the hillocks 107 and/or using scaffolding and the like.

As also depicted in FIG. 8, the controller 220 may further determine a heading 899 of the building 101, for example to align the model 205 with paths of the Sun 109 and the Moon 111.

For example, as also depicted in FIG. 8, respective time dependent paths 809, 811 of the Sun 109 and the Moon 111, relative to the models 301, 305, 307 (e.g. the building 101 etc.) and/or the heading 899, are rendered at the display device using the data 236. While the entirety of the paths 809, 811 are depicted, it is appreciated that the positions of the Sun 109 and the Moon 111 along their respective paths 809, 811 may be controlled in the time dependent previsualization projection mapping model 701 using an input device 228 and/or a graphic user interface, for example a slider 812, to set a date and time for the time dependent previsualization projection mapping model 701.

At the time depicted, however, the Moon 111 is positioned relative to one of the trees 105, as represented by the models 305, such that light 813 from the Moon 111 causes one of the trees 105 to cast a shadow 814 onto the facade of the building 101 (again, as represented by the model 301). The shadow 814 depicted in FIG. 8 is an estimate of a shape of a shadow cast by an actual tree 105, as the models 305 of the trees 105 are not exact and/or low-resolution.

Furthermore, as depicted, an indication 815 of an estimated crowd (e.g. at a given time as selected, for example, by the slider 812) is rendered at the display device 226 using the event data 238, which may include an estimate 816 of ambient light emitted by the estimated crowd, the estimate 816 also being time dependent (and hence also adjustable using, for example, the slider 812).

As also depicted in FIG. 8, a time dependent estimate 818 of cloud cover (e.g. at a given time as selected, for example, by the slider 812) has been rendered at the display device 226 using the weather data 213.

While not depicted, the time dependent previsualization projection mapping model 701 may further include time dependent estimates of ambient light from adjacent buildings and/or streetlamps as described above.

As further depicted in FIG. 8, respective models 803 of the projectors 103 have been positioned to projection map portions 834-1, 834-2, 834-3 of the images 234 onto the building 101, as represented by the model 301 (the portions 834-1, 834-2, 834-3 interchangeably referred to hereafter, collectively, as the portions 834 and, generically, as a portion 834). While only three portions 834 are depicted, the number of portions 834 corresponds to the number of projectors 103 and/or the number of projector models 803.

The portions 834 are depicted intermediate a respective projector model 803 and the model 301 of the building 101, though it is understood that the portions 834 are (e.g. virtually) projected onto the model 301 within the time dependent previsualization projection mapping model 701.

For example, the portions 834-1, 834-2 are to be projected onto the facade 113 of the building 101, and the portion 834-3 is to be projected onto a side of the building 101. In other words, the portions 834 are determined using the three-dimensional geometry of the building 101 as represented in the model 301 and/or the model 205.

In particular, the portion 834-1 is to be projected onto the facade 113 of the building 101 that includes the shadow 814, and hence the portion 834-1 includes an area 844 that has a brightness that has been adjusted to compensate for the shadow 814 and/or the brightness remaining areas of the portion 834-1 are adjusted to compensate for the shadow 814. In other words, the region of the building 101 around the shadow 814 will be illuminated by the light 813 from the Moon 111, and hence the area 844 of the portion 834-1 compensates for the difference in brightness of the illumination of the building 101 by the Moon 111.

Indeed, a position and/or shape of the area 844 is further time dependent as based on the data 236.

Indeed, any time dependent ambient light factors as determined from the model 205, the data 236, the event data 238, and the weather data 213 may be used to adjust the portions 834-1, 834-2, 834-3 of the images 234. In other words, the portions 834 are time dependent according to the determined time-dependent ambient lighting conditions.

Hence, the positions of the models 301, 305, 307, as well as the models 803 and the images 234, are initially used to determine locations of the projectors 103 at the location 100 in order to projection map the images 234, and then the portions 834 of the images 234 are adjusted for ambient light based on one or more of the model 205, the data 236, the event data 238, and the weather data 213.

Also depicted in FIG. 8 is a geographic viewing location 850 which can comprise a location from which the projection mapping is to be viewed at the event. In some implementations, the geographic viewing location 850 can be preconfigured, for example in the event data 238, as there may be a limited area adjacent the building 101 where an associated event may be held. In these implementations, the controller 220 further generates the time dependent previsualization projection mapping model 701 for the object further using the geographic viewing location 850, for example to determine positions of the projectors 103 and/or warping of the portions 834 such that the projection mapped images 234 appear according to a given perspective and/or aspect ratio from the geographic viewing location 850.

Alternatively, the controller 220 may be further configured to determine, from the time dependent previsualization projection mapping model 701, a best geographic viewing location for viewing projection mapping of the images onto the object. For example, the model 205 may indicate that areas adjacent the building 101 that are better for viewing the projection mapping and/or for managing crowds: for example, areas where the trees 105 are located, as indicated by the models 305 and/or areas where the hillocks 107 are located, as indicated by the models 307, would not be selected as a best geographic viewing location. However, an area adjacent the building 101, having sightlines to the facade 113 may be selected as a best geographic viewing location.

Hence, the geographic viewing location 850 may be predetermined, or selected as a best geographic viewing location by the controller 220.

Indeed, the geographic viewing location 850, whether predetermined or selected by the controller 220, may be used to plan crowd control at an associated event, for example to direct crowds towards an area around the geographic viewing location 850 using fencing, and the like.

In any event, in this manner, the time dependent previsualization projection mapping model 701 may be used to render a time-dependent previsualization of projection mapping onto the building 101 prior to any site visit to the building 101.

Furthermore, using the time dependent previsualization projection mapping model 701 the suitability of the location 100 for projection mapping may be determined as well as a cost estimate for implementing the projection mapping. For example, using the time dependent previsualization projection mapping model 701 it may be determined that the number of hours of sun at the location 100 makes a projection mapping based event unlikely to be popular (e.g. as the projection mapping may be washed out by the Sun until late into the evening in summer at high latitudes). Similarly, from the time dependent previsualization projection mapping model 701, it may be determined that the shadows on the building 101 would degrade the projection mapping and/or would require a large number of projectors than a budget allows. Indeed, the model 205 and/or associated data may also be used to determine whether the location 100 is popular with people who would likely attend a projection mapping based event; for example, the device 201 may determine whether the location 100 is popular or not based on a number of photos of the location 100 posted in social media sites and/or at the server 203.

Hence, the time dependent previsualization projection mapping model 701 may be used to evaluate the location 100 for projection mapping prior to any site visit, which can be expensive.

Furthermore, the application 232, the method 400 and/or the time dependent previsualization projection mapping model 701 may be implemented as a stand-alone application and/or as a plug-in to a browser application.

For example, a browser may be used to browse to an object and/or building and/or structure of interest using a map server, such as Google™ maps, and the like, and images may be accessed and/or generated for projection onto the object and/or building and/or structure of interest within the plug-in. Drag and drop operations, and the like, may be used to select the projector locations, and the plug-in can implement the method 400 to show the time dependent previsualization projection mapping model 701 within the plug-in at the browser application.

However, once the time dependent previsualization projection mapping model 701 has been generated, and/or used to estimate projector location and the like, a site visit can occur to generate a second computer model of the object (e.g. the building 101) comprising a higher resolution computer model than the publicly available three-dimensional computer model 205. Such higher resolution computer model is then used to more precisely generate portions of the images 234 for projection mapping. For example, the model 205 does not include detail of the facade 113 (such as the steps and the columns), so the second higher resolution computer model is used to determine locations of the detail of the facade 113 to implement in-situ projection mapping.

Figure 9:
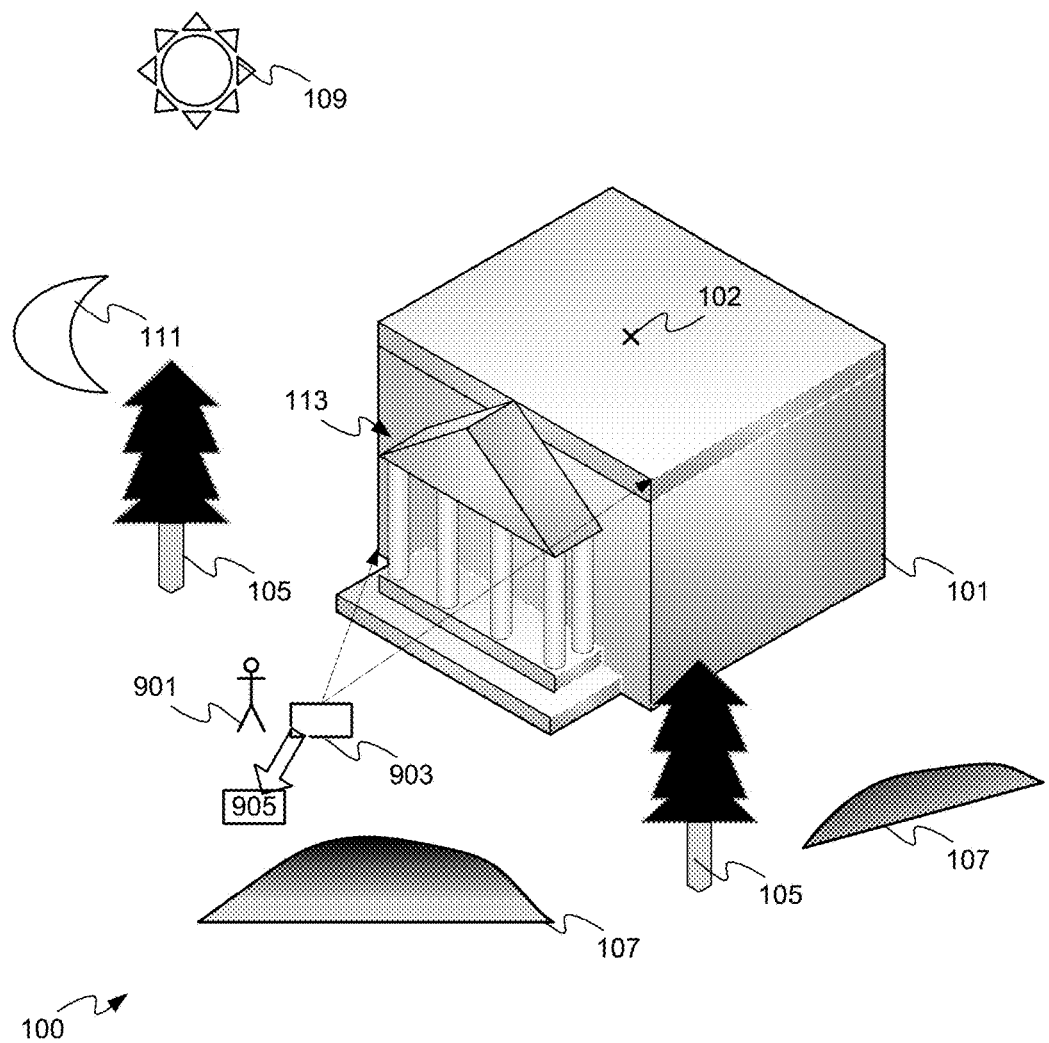
FIG. 9 depicts a higher resolution model of the building being generated at the location of FIG. 1, according to non-limiting implementations.

For example, attention is next directed to FIG. 9, which is substantially similar to FIG. 1, with like elements having like numbers. However, in FIG. 9, a surveyor 901 is using a laser scanning device 903 (e.g. a LIDAR (Light Detection and Ranging) device, and the like) to scan the surfaces of the building 101 (e.g. as depicted, the facade 113) to generate a model 905 of the building 101 that is of a higher resolution than the model 205. However, such a model 905 may also be obtained and/or generated from blueprints of the building 101, CAD drawings of the building 101, and the like.

Figure 10:
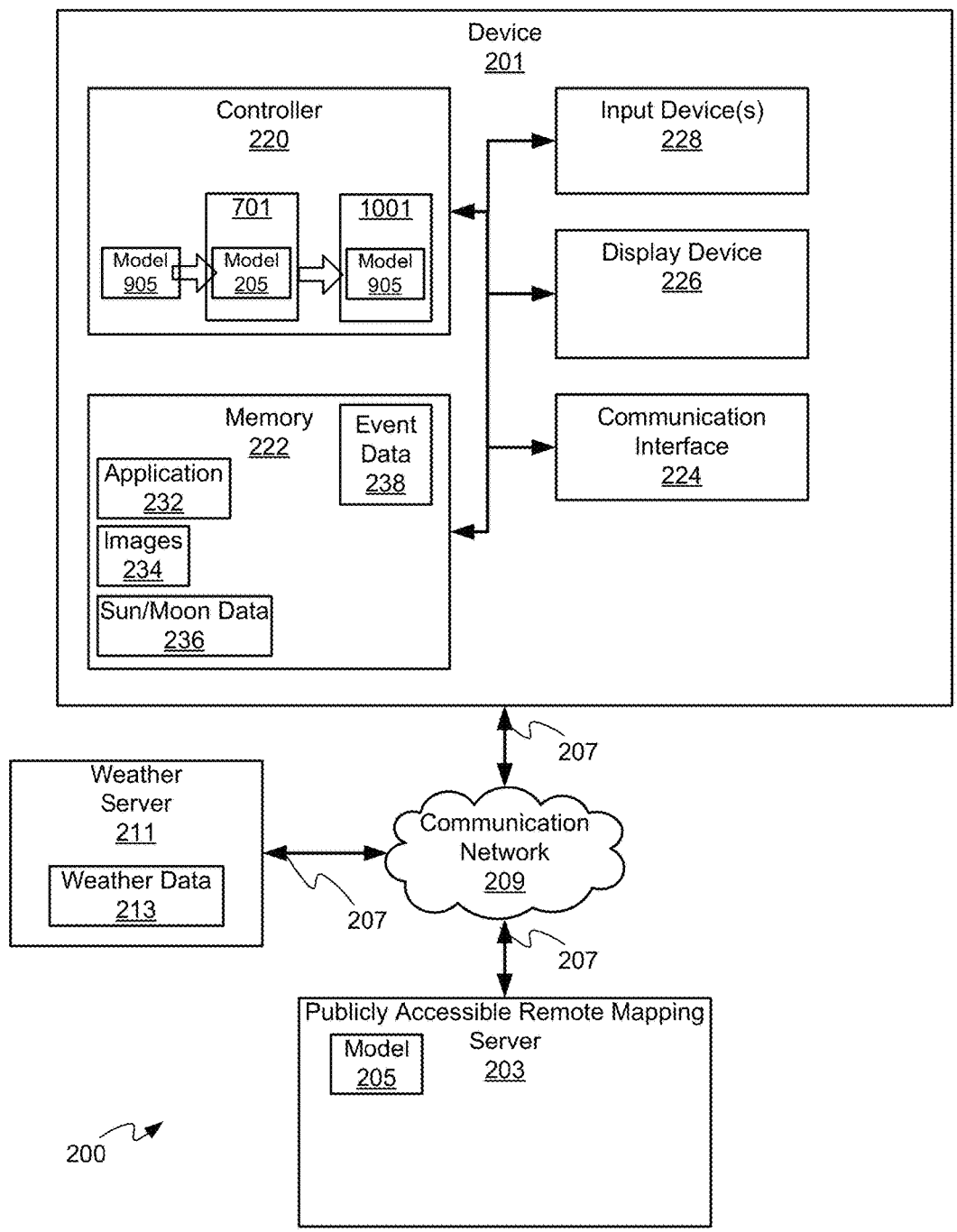
FIG. 10 depicts the device of FIG. 2 generating an updated time dependent previsualization projection mapping model using a higher resolution model of the building, according to non-limiting implementations.

Attention is next directed to FIG. 10, which is substantially similar to FIG. 2, with like elements having like numbers. However, FIG. 10 depicts an example implementation of the block 408 of the method 400. It is assumed in FIG. 10 that the time dependent previsualization projection mapping model 701 has been generated and that the time dependent previsualization projection mapping model 701 includes the model 205, as depicted in FIG. 8. It is further assumed in FIG. 10 that the model 905 has been received at the controller 220 (e.g. for example as uploaded to the device 201 by the surveyor 901 using an associated communication device, not depicted).

As depicted in FIG. 10, the controller 220 is aligning the second model 905 of the building 101 with the model 205 of the building 101 to generate an updated time dependent previsualization projection mapping model 1001 that includes the model 905; however, portions of the model 205 that correspond to the model 905 are replaced by the model 905 (e.g. the model 301).

Figure 11:
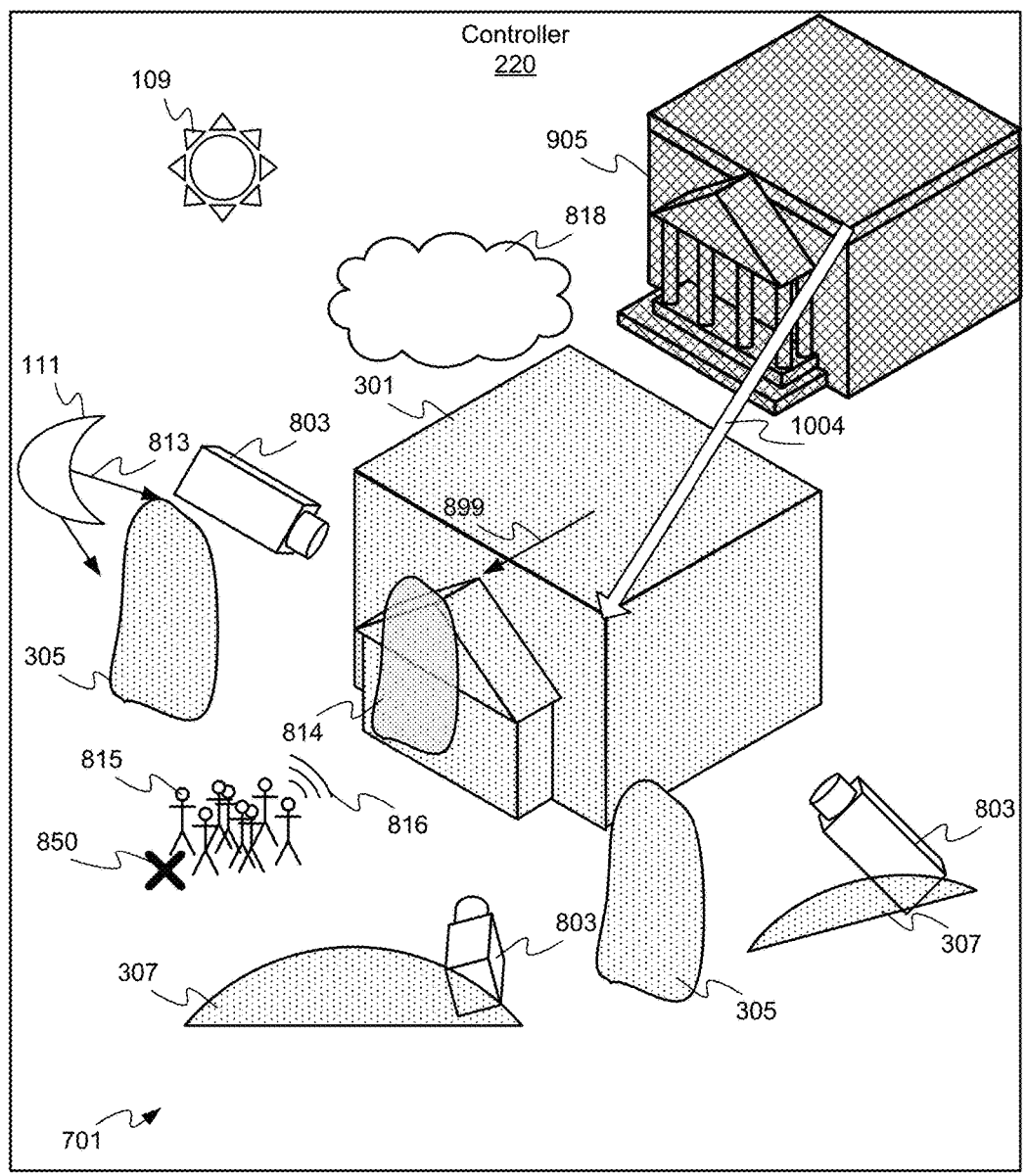
FIG. 11 depicts the higher resolution model being aligned with the publicly available three-dimensional computer model to generate the updated time dependent previsualization projection mapping model

For example, attention is directed to FIG. 11, which is substantially similar to FIG. 8, with like elements having like numbers, however in FIG. 11 the time dependent previsualization projection mapping model 701 is not being rendered at the display device 226; rather, the controller 220 is aligning the second computer model 905 of the building 101 with the computer model 205 of the object (and specifically the model 301 of the building 101) within the time dependent previsualization projection mapping model 701. In FIG. 11 the paths 809, 811 of the Sun 109 and Moon 111 are not depicted, but are nonetheless assumed to be present.

As depicted, the second computer model 905 comprises a higher resolution computer model than the publicly available three-dimensional computer model 205 and hence detail of the building 101 is included in the second computer model 905, such as the steps and columns of the facade 113.

As also indicated in FIG. 11, the controller 220 is aligning the second computer model 905 of the building 101 with the computer model 205 using, for example an iterative closest point (ICP) process, and the like, to align corners and/or edges and/or surfaces and/or features of the model 905 with corresponding corners and/or edges and/or surfaces and/or features of the model 205, as represented by the arrow 1004.

Figure 12:
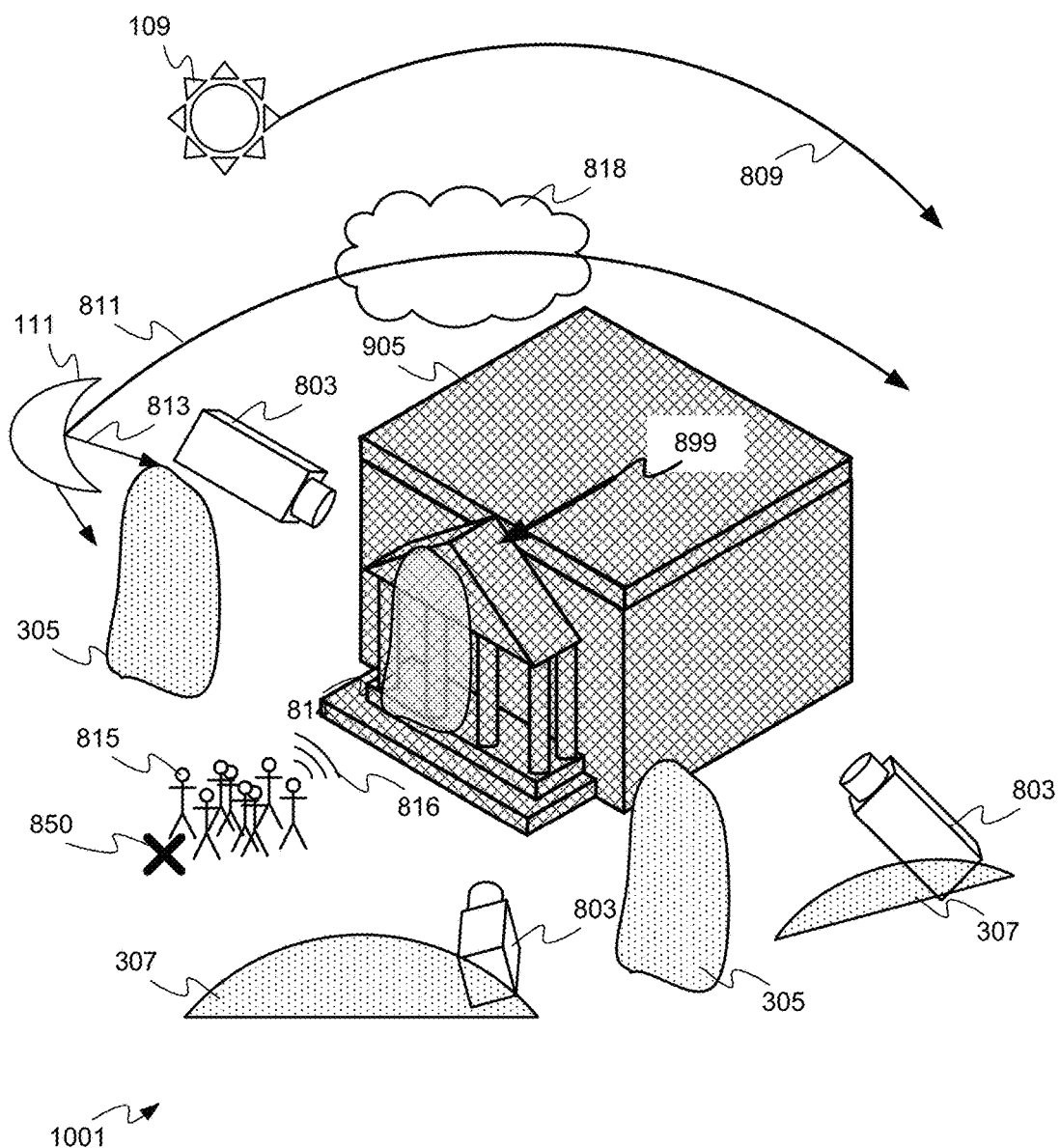
FIG. 12 depicts a visual representation of the updated time dependent previsualization projection mapping model, according to non-limiting implementations.

The resulting updated time dependent previsualization projection mapping model 1001 is depicted in FIG. 12 in which the model 905 replaces the model 301. Hence, the updated time dependent previsualization projection mapping model 1001 may be used to generate portions of the images 234 to be projected by the projectors 103 to account for the detail of the building 101 represented in the model 905.

Put another way, the controller 220 may be further configured to generate an updated time dependent previsualization projection mapping model 1001 for controlling one or more projectors 103 to project the images 234 onto an object (e.g. the building 101) using: the second computer model 905; alignment of the second computer model 905 of the object with the computer model of 205 the object; and the time dependent previsualization projection mapping model 701.

Put yet another way, the controller 220 may be further configured to augment the second computer model 905 of the object with geographic data from the computer model 205 of the object. For example, the updated time dependent previsualization projection mapping model 1001 includes geographic data such as positions and/or elevations of the trees 105 and the hillocks 107, as represented by the models 305, 307 from the model 205. Furthermore, the model 905 is aligned with the heading 899.

In any event, the updated time dependent previsualization projection mapping model 1001 may be used to confirm and/or re-determine the locations of the projectors 103 and further produce portions of the images 234 specifically for projection mapping onto the details of the building 101.

Figure 13:
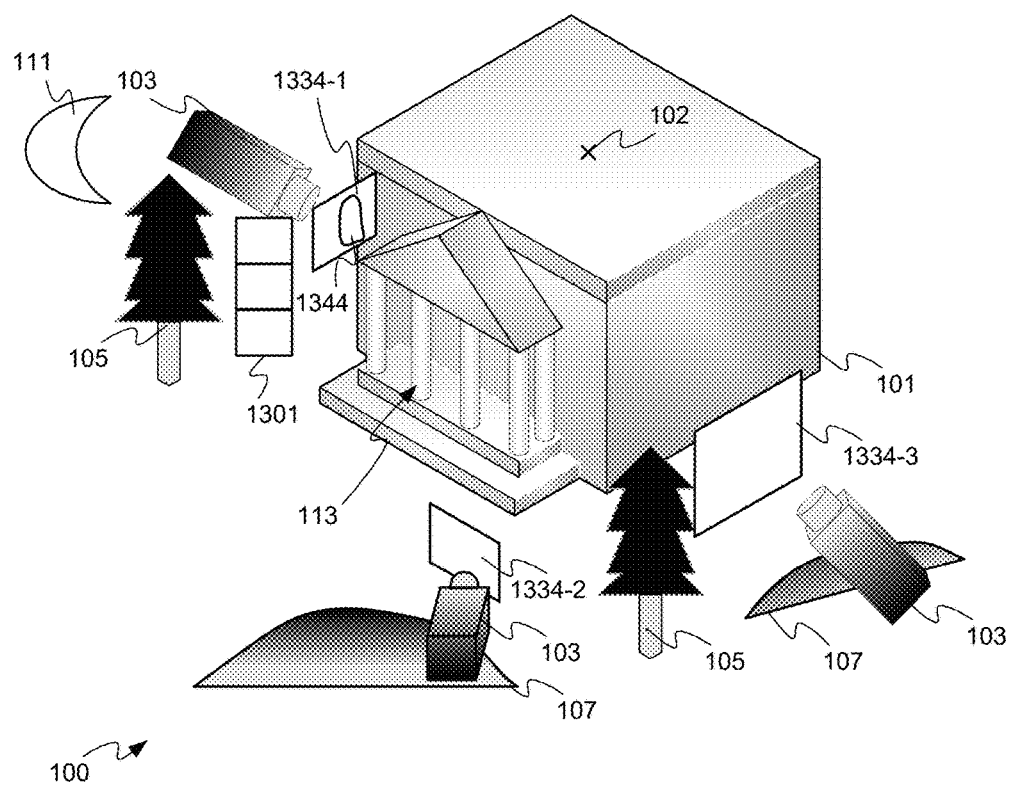
FIG. 13 depicts in-situ projection mapping at the location of FIG. 1, as planned using the updated time dependent previsualization projection mapping model, according to non-limiting implementations.

For example, attention is directed to FIG. 13 which depicts in-situ deployment of the projectors 103 at the location 100 (FIG. 13 being substantially similar to FIG. 1, with like elements having like numbers), at locations corresponding to the locations of the models 803 as depicted in FIG. 8. Furthermore, scaffolding 1301 and the like may be used to located one or more of the projectors 103. Furthermore, the updated time dependent previsualization projection mapping model 1001 has been used to determine portions 1334-1, 1334-2, 1334-3 of the images 234 that are projection mapped onto the building 101 by the projectors 103, (the portions 1334-1, 1334-2, 1334-3 interchangeably referred to hereafter, collectively, as the portions 1334 and, generically, as a portion 1334). Each of the portions 1334-1, 1334-2, 1334-3 correspond to the portions 834-1, 834-2, 834-3 and hence the portion 1334-1 includes an area 1344 corresponding to the area 844 to compensate for a tree shadow (not depicted) similar to the shadow 814. Furthermore, like the portions 834, the portions 1334 are time dependent according to the determined time-dependent ambient lighting conditions.

Furthermore, the portions 1334 may be stored at each of the projectors 103 (e.g. the portions 1334 are loaded and/or uploaded to the projectors 103) and/or the portions 1334 are transmitted to the projectors 103 by a device (not depicted) controlling the projectors 103 and with which the projectors 103 are in communication.

Disclosed herein is an apparatus and method for automated projection mapping previsualization in which online repositories of 3D building models and/or object information (e.g. Google™ Maps and the like) are accessed to retrieve low-resolution and/or publicly available models of building and/or objects. The latitude/longitude of a location can be determined from such models and used to determine the natural ambient light conditions due to the Sun and the Moon and/or event to determine a time of year that may be better for projection mapping: for example, in regions close to the Arctic Circle, projection mapping may difficult in the summer months. Furthermore, weather in the area can be determined to adjust the projection mapping, or alternatively to, determine how many hours (e.g. on average) projection mapping may be effective (e.g. according to how much sunny days are in a given time period, on average). Furthermore, the three-dimensional building models can be downloaded and used to help determine projector placement, as well as generate estimates of images to be projected using the three-dimensional geometry of the building. Indeed, such online information may be further used to select sites and locations for consideration for projection mapping (e.g. at locations where people take a lot of photos and the like); hence social media may be incorporated into determining projection mapping locations.

Hence, using the disclosed apparatus and method may enable browsing of a map server, such as Google™ Maps, selection of a location for evaluation for projection mapping, and an automatic estimate of projector placement to render a previsualization of projection mapping at the location. The previsualization is viewable at a display device, that may include a virtual reality device, and further may enable an evaluation of the suitability of the location for projection mapping and/or the cost.

Furthermore, the disclosed method may be implemented as a stand-alone application and alternatively implemented as a plug-in to a browser application, for example, to access a map server to download an object model and, using the plug-in, perform a projection mapping previsualization within the browser application.

Those skilled in the art will appreciate that in some implementations, the functionality of the device 201 can be implemented using pre-programmed hardware or firmware elements (e.g., application specific integrated circuits (ASICs), electrically erasable programmable read-only memories (EEPROMs), etc.), or other related components. In other implementations, the functionality of the device 201 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A device comprising:
    a communication interface, and a controller configured to:
        receive, using the communication interface, a computer model of an object from a publicly accessible remote mapping server, the computer model comprising a publicly available three-dimensional computer model, the computer model defining the object in geographic coordinates and elevation coordinates, the object located at given geographic coordinates;
        generate a time dependent previsualization projection mapping model for the object using: images to be projected onto the object, the computer model and data for generating one or more of Sun behavior and Moon behavior at the given geographic coordinates, wherein the time dependent previsualization projection mapping model for the object includes an indication of where to geographically locate one or more projectors, relative to the object, the one or more projectors for projecting the images onto the object; and,
        control a display device to render a previsualization of the time dependent previsualization projection mapping model.

2. The device of claim 1, wherein the controller is further configured to receive, from a weather server, weather data for the given geographic coordinates, and generate the time dependent previsualization projection mapping model for the object further using the weather data.

3. The device of claim 1, wherein the computer model of the object further includes a three-dimensional model of a geographic region adjacent the object, and the controller is further configured to generate the time dependent previsualization projection mapping model for the object further using the three-dimensional model of the geographic region adjacent the object.

4. The device of claim 1, wherein the controller is further configured to generate the time dependent previsualization projection mapping model for the object further using event data defining an event that is to occur proximal the object.

5. The device of claim 1, wherein the controller is further configured to generate the time dependent previsualization projection mapping model for the object further using a geographic viewing location.

6. The device of claim 1, wherein the controller is further configured to determine, from the time dependent previsualization projection mapping model, a geographic viewing location for viewing projection mapping of the images onto the object.

7. The device of claim 1, wherein the controller is further configured to align a second computer model of the object with the computer model of the object, the second computer model of the object comprising a higher resolution computer model than the publicly available three-dimensional computer model.

8. The device of claim 7, wherein the controller is further configured to generate an updated time dependent previsualization projection mapping model for controlling the one or more projectors to project the images onto the object using: the second computer model; alignment of the second computer model of the object with the computer model of the object; and the time dependent previsualization projection mapping model.

9. The device of claim 7, wherein the controller is further configured to augment the second computer model of the object with geographic data from the computer model of the object.

10. The device of claim 1, wherein the publicly available three-dimensional computer model includes one or more of a building model, a DXF (Drawing Exchange Format) file, a GIS (geographic information system) file, a PCD (Point Cloud Data) file, an OBJ file, and a color coordinate file defining color of the object.

11. A method comprising:
- receiving, at a controller, using a communication interface, a computer model of an object from a publicly accessible remote mapping server, the computer model comprising a publicly available three-dimensional computer model, the computer model defining the object in geographic coordinates and elevation coordinates, the object located at given geographic coordinates;
- generating, using the controller, a time dependent previsualization projection mapping model for the object using images to be projected onto the object, the computer model, and data for generating one or more of Sun behavior and the Moon behavior at the given geographic coordinates, wherein the time dependent previsualization projection mapping model for the object includes an indication of where to geographically locate one or more projectors, relative to the object, the one or more projectors for projecting the images onto the object; and,
- controlling, using the controller, a display device to render a previsualization of the time dependent previsualization projection mapping model.

12. The method of claim 11, further comprising: receiving, at the controller, from a weather server, weather data for the given geographic coordinates; and generating, using the controller, the time dependent previsualization projection mapping model for the object further using the weather data.

13. The method of claim 11, wherein the computer model of the object further includes a three-dimensional model of a geographic region adjacent the object, and hone the method further comprises generating, using the controller, the time dependent previsualization projection mapping model for the object further using the three-dimensional model of the geographic region adjacent the object.

14. The method of claim 11, further comprising: generating, using the controller, the time dependent previsualization projection mapping model for the object further using event data defining an event that is to occur proximal the object.

15. The method of claim 11, further comprising: generating, using the controller, the time dependent previsualization projection mapping model for the object further using a geographic viewing location.

16. The method of claim 11, further comprising: determining, using the controller, from the time dependent previsualization projection mapping model, a best geographic viewing location for viewing projection mapping of the images onto the object.

17. The method of claim 11, further comprising: aligning, using the controller, a second computer model of the object with the computer model of the object, the second computer model of the object comprising a higher resolution computer model than the publicly available three-dimensional computer model.

18. The method of claim 17, further comprising: generating, using the controller, an updated time dependent previsualization projection mapping model for controlling the one or more projectors to project the images onto the object using: the second computer model; alignment of the second computer model of the object with the computer model of the object; and the time dependent previsualization projection mapping model.

19. The method of claim 17, further comprising: augmenting, using the controller, the second computer model of the object with geographic data from the computer model of the object.

20. A device comprising:
- a communication interface, and a controller configured to:
  - receive, using the communication interface, a computer model of an object from a publicly accessible remote mapping server, the computer model comprising a publicly available three-dimensional computer model, the computer model defining the object in geographic coordinates and elevation coordinates, the object located at given geographic coordinates;
  - generate a time dependent previsualization projection mapping model for the object using: images to be projected onto the object, the computer model and data for generating one or more of Sun behavior and Moon behavior at the given geographic coordinates;
  - control a display device to render a previsualization of the time dependent previsualization projection mapping model;
  - align a second computer model of the object with the computer model of the object, the second computer model of the object comprising a higher resolution computer model than the publicly available three-dimensional computer model; and
  - generate an updated time dependent previsualization projection mapping model for controlling one or more projectors to project the images onto the object using: the second computer model; alignment of the second computer model of the object with the computer model of the object; and the time dependent previsualization projection mapping model.

* * * * *